(12) United States Patent
Zhang (10) Patent No.: US 11,224,290 B1
(45) Date of Patent: Jan. 18, 2022

(54) MULTIFUNCTIONAL DRAINING RACK

(71) Applicant: Jun Zhang, Shenzhen (CN)

(72) Inventor: Jun Zhang, Shenzhen (CN)

( * ) Notice: Subject to any disclaimer, the term of this patent is extended or adjusted under 35 U.S.C. 154(b) by 0 days.

(21) Appl. No.: 17/032,697

(22) Filed: Sep. 25, 2020

(51) Int. Cl.
| | | |
|---|---|---|
| *A47B 81/02* | (2006.01) | |
| *B08B 13/00* | (2006.01) | |
| *A46B 17/08* | (2006.01) | |
| *F16B 1/00* | (2006.01) | |
| *A47B 95/00* | (2006.01) | |
| *A47J 47/20* | (2019.01) | |
| *A47G 29/08* | (2006.01) | |

(52) U.S. Cl.
CPC .............. *A47B 81/02* (2013.01); *A46B 17/08* (2013.01); *A47B 95/008* (2013.01); *A47G 29/08* (2013.01); *A47J 47/20* (2013.01); *B08B 13/00* (2013.01); *F16B 1/00* (2013.01); *A46B 2200/3033* (2013.01); *F16B 2001/0035* (2013.01)

(58) Field of Classification Search
CPC ......... A47B 81/02; A47B 95/008; F16B 1/00; F16B 2001/0035; A46B 17/08; A46B 2200/3033; B08B 13/00; A47K 10/04; A47G 29/08; A47J 47/20
See application file for complete search history.

(56) References Cited

U.S. PATENT DOCUMENTS

| | | | | | |
|---|---|---|---|---|---|
| 1,476,034 | A | * | 12/1923 | Banks ..................... | A47K 10/04 211/99 |
| 2,042,517 | A | * | 6/1936 | Ellis ........................ | F25D 25/02 108/135 |
| 2,214,869 | A | * | 9/1940 | West ........................ | A47K 5/02 211/85.12 |
| 3,023,991 | A | * | 3/1962 | Fisher ..................... | A47G 1/17 248/205.3 |
| 4,334,621 | A | * | 6/1982 | Weber ..................... | A47G 29/08 211/70.3 |
| 4,345,688 | A | * | 8/1982 | De Boer .................. | B25H 3/04 211/106 |
| 4,905,951 | A | * | 3/1990 | Putness .................. | A47L 13/512 211/66 |
| D475,561 | S | * | 6/2003 | Suero, Jr. ................ | D6/525 |
| 7,353,970 | B1 | * | 4/2008 | Harrison-Coats ....... | A47F 1/065 221/123 |
| 8,296,876 | B2 | * | 10/2012 | Yang ....................... | A47J 47/20 4/656 |
| 8,522,998 | B2 | * | 9/2013 | Crookshanks ........ | A47L 15/502 220/488 |

(Continued)

*Primary Examiner* — Ko H Chan
(74) *Attorney, Agent, or Firm* — Li & Cai Intellectual Property (USA) Office (57) ABSTRACT

A multifunctional draining rack, which relates to the technical field of draining appliances, includes: a draining rack body provided with a storage space; a cleaning brush holder detachably assembled on the draining rack body; and a towel hanger rotatably assembled on the draining rack body and used to rotate relative to the draining rack body for folding or in use; and a fixing device detachably assembled on the draining rack body for fixing the draining rack body on the use wall. The use of the above technical solution has the advantages of multiple functions, classified storage, small occupation space, high flexibility of adjustable storage space, diverse installation methods, convenient disassembly and assembly, and good user experience.

8 Claims, 9 Drawing Sheets

(56) References Cited

U.S. PATENT DOCUMENTS

| | | | | |
|---|---|---|---|---|
| 8,763,818 B1* | 7/2014 | Pargansky | ............... | A47L 17/00 |
| | | | | 211/41.3 |
| 8,973,763 B2* | 3/2015 | Pargansky | ............... | A47L 19/04 |
| | | | | 211/41.3 |
| 9,462,930 B2* | 10/2016 | Bastuji | ................... | A47L 15/507 |
| 9,848,723 B1* | 12/2017 | Huang | ................... | A46B 17/08 |
| 9,883,742 B2* | 2/2018 | Yang | ...................... | A47K 3/281 |
| 2007/0131629 A1* | 6/2007 | Sullivan | ................... | A47L 19/04 |
| | | | | 211/41.3 |
| 2010/0288659 A1* | 11/2010 | Dang | ....................... | A47K 1/09 |
| | | | | 206/277 |
| 2015/0230667 A1* | 8/2015 | Palazzolo | ............... | E03C 1/186 |
| | | | | 4/654 |

* cited by examiner

MULTIFUNCTIONAL DRAINING RACK

FIELD OF THE DISCLOSURE

The present disclosure relates to the technical field of draining appliances, in particular to a multifunctional draining rack.

BACKGROUND OF THE DISCLOSURE

Draining rack is a kind of kitchen and bathroom utensils, and is generally installed on bathroom walls and in sinks. It is mainly used to drain the water retained in cleaning cloths, cleaning brushes, cleaning balls, cleaning sponges, bath brushes and other items, and to store cleaning supplies and toiletries.

However, the existing draining rack has a single function and a simple design structure. Generally, it can only store and drain a single cleaning product and toiletries, and cannot be sorted and drained; in addition, the draining rack with sorted storage has a larger shape and is incapable of adjusting the storage space according to demand, which not only brings a lot of trouble and inconvenience to users, but also cannot meet people's demand for high-quality life. Therefore, there is still room for improvement.

SUMMARY OF THE DISCLOSURE

The purpose of the present disclosure is to address the defects and shortcomings of the prior art, so a multifunctional draining rack is provided which has the advantages of multiple functions, classified storage, small occupation space, high flexibility of adjustable storage space, diverse installation methods, convenient disassembly and assembly, and good user experience.

In order to achieve the above objective, the technical solution adopted by the present disclosure is to provide a multifunctional draining rack, comprising: a draining rack body provided with a storage space; a cleaning brush holder detachably assembled on the draining rack body; and a towel hanger assembled on the draining rack body and configured to rotate relative to the draining rack body for folding or in use.

The cleaning brush holder comprises: a brush holder body on which an insertion portion for inserting a cleaning brush is provided; a plurality of elastic abutment blocks are provided on an edge portion of the insertion portion, and the elastic abutment blocks are compressed and deformed during the insertion and placement of the cleaning brush, and after the cleaning brush is inserted, the cleaning brush is pressed tightly to maintain in a fixed inserted state under the action of restoring force of the elastic abutment blocks, and wherein clamping slots are symmetrically provided at both ends of the insertion portion on the brush holder body, and a rack bar of the draining rack body is clamped in the clamping slots to embody that the cleaning brush holder and the draining rack body are detachably assembled.

A plurality of the elastic abutment blocks are arranged equidistantly along a circumferential direction of the insertion portion, and one end of the elastic abutment blocks away from the edge portion is oriented to the center of the insertion portion.

The towel hanger comprises: a hanger body rotatably assembled on the draining rack body and configured to rotate relative to the draining rack body to be folded on the draining rack body or in use; a rotating member assembled between the hanger body and the draining rack body; and a stopper assembled between the hanger body and the draining rack body for limiting a rotation angle of the hanger body to maintain the hanger body in usage state.

The stopper comprises: an eccentric ball assembled on the hanger body and located on a side of the rotating member and configured to rotate with the hanger body to be abutted against the draining rack body, and the hanger body is offset from a center of the eccentric ball.

The rotating member comprises: a rotating block on which two mounting holes are assembled at intervals, and the mounting holes are respectively configured to assemble the hanger body and the draining rack body.

The multifunctional draining rack further comprises: a fixing device detachably assembled on the draining rack body and configured to fix and mount the draining rack body on a wall surface.

The fixing device comprises: a fixing plate; a clamping assembly fixedly assembled on the fixing plate for clamping the draining rack body; and a connecting piece of which one end is fixedly assembled on the fixing plate, and the other end is fixedly connected to the wall surface.

The clamping assembly comprises: a bracket block fixedly assembled on the fixing plate and configured to support a rack bar of the draining rack body; a mounting position provided on the fixing plate; and a buckle block hinged on the mounting position by a rotating shaft and configured to rotate relative to the fixing plate to buckle or unbuckle with the bracket block to clamp or loosen the rack bar of the draining rack body.

A limiting hole is provided on the draining rack body, and the fixing device comprises: a first magnetic attraction component inserted into the limiting hole; and a second magnetic attraction component arranged on the wall surface and configured in conjunction with the first magnetic attraction component to fix the draining rack body.

After adopting the above technical scheme, the beneficial effects of the present disclosure are as follows.

First, during installation, the first magnetic attraction component clamped on the draining rack body and the second magnetic attraction component adhered to the outer wall of the sink can be sucked together to assemble the draining rack body in the sink to achieve convenient disassembly and assembly effect. After the draining rack body is clamped by the clamping assembly provided on the fixing plate, the connecting piece can be adhered to the wall surface, which is suitable for installation in multiple places.

Second, during use, according to the user's hand habits, the symmetrical clamping slots on both ends of the brush holder body are clamped with the rack bars of the draining rack body to install the cleaning brush holder on the left or right side of the draining port of the draining rack body to make it easier for users to access. When the brush holder does not need to be cleaned, it is disassembled to increase the use space of the draining rack body and achieve the effect of flexible space adjustment.

Third, the elastic abutment block is arranged on the installation position, so that when the cleaning brush is inserted, the elastic abutment block is compressed and deformed during the insertion and placement of the cleaning brush, and after the cleaning brush is inserted, the cleaning brush is pressed tightly to maintain in a perpendicular manner to the placement surface under the action of restoring force of the elastic abutment block, which improves the neatness of storage, and avoids the problem of oblique protrusions occupying the space of the sink when the cleaning brush is inserted obliquely, and the process of inserting and removing the cleaning brush is very quiet, docile and comfortable.

Fourth, the towel hanger is assembled on the draining rack body by rotating members. When there is no need to dry towels, the towel hanger can be rotated to fold on the draining rack body, which can save the space of the draining tank and the bathroom. In addition, the stopper is an eccentric ball assembled on the towel hanger, and the eccentric ball can stop the towel hanger at a predetermined drying angle after rotating relative to the draining rack body, and protect the towel hanger and the draining rack body from being scratched. The multifunctional draining rack provided by the present disclosure has the advantages of multiple functions, classified storage, small footprint, adjustable storage space, high flexibility, diverse installation methods, convenient disassembly and assembly, and good user experience.

BRIEF DESCRIPTION OF THE DRAWINGS

In order to explain the embodiments of the present disclosure or the technical solutions in the prior art more clearly, the following will briefly introduce the drawings that need to be used in the description of the embodiments or the prior art. Obviously, the drawings in the following description are only some embodiments of the present disclosure. For those of ordinary skill in the art, other drawings can be obtained based on these drawings without creative labor.

Reference numeral: 1. draining rack body; 2. cleaning brush holder; 21. brush holder body; 22. inserting plate; 23. elastic abutment block; 3. towel hanger; 31. hanger body; 311. hanging rod; 312. connecting rod; 313. supporting rod; 32. rotating member; 33. stopper; 4. fixing device; 41. fixing plate; 42. clamping assembly; 421. bracket block; 422. mounting position; 423. buckle block; 43. connecting piece; 44. first magnetic attraction component; 441. fixing assembly; 442. first magnetic attraction part; 443. flexible washer; 45. second magnetic attraction component; 451. second magnetic attraction part 452. adhesive layer; 46. supporting frame; 47. protective cover; 5. sink; a. limiting hole; b. first draining sink; c. second draining sink; d. water collection tank; e. clamping slot.

DETAILED DESCRIPTION OF THE EXEMPLARY EMBODIMENTS

The present disclosure will be further described in detail below in conjunction with the drawings.

This specific embodiment is only an explanation of the present disclosure, and it is not a limitation of the present disclosure. After reading this specification, those skilled in the art can make modifications to this embodiment that do not create any contribution as needed, but as long as the rights of the present disclosure, all requirements are protected by patent law.

Embodiment 1

Figure 1:
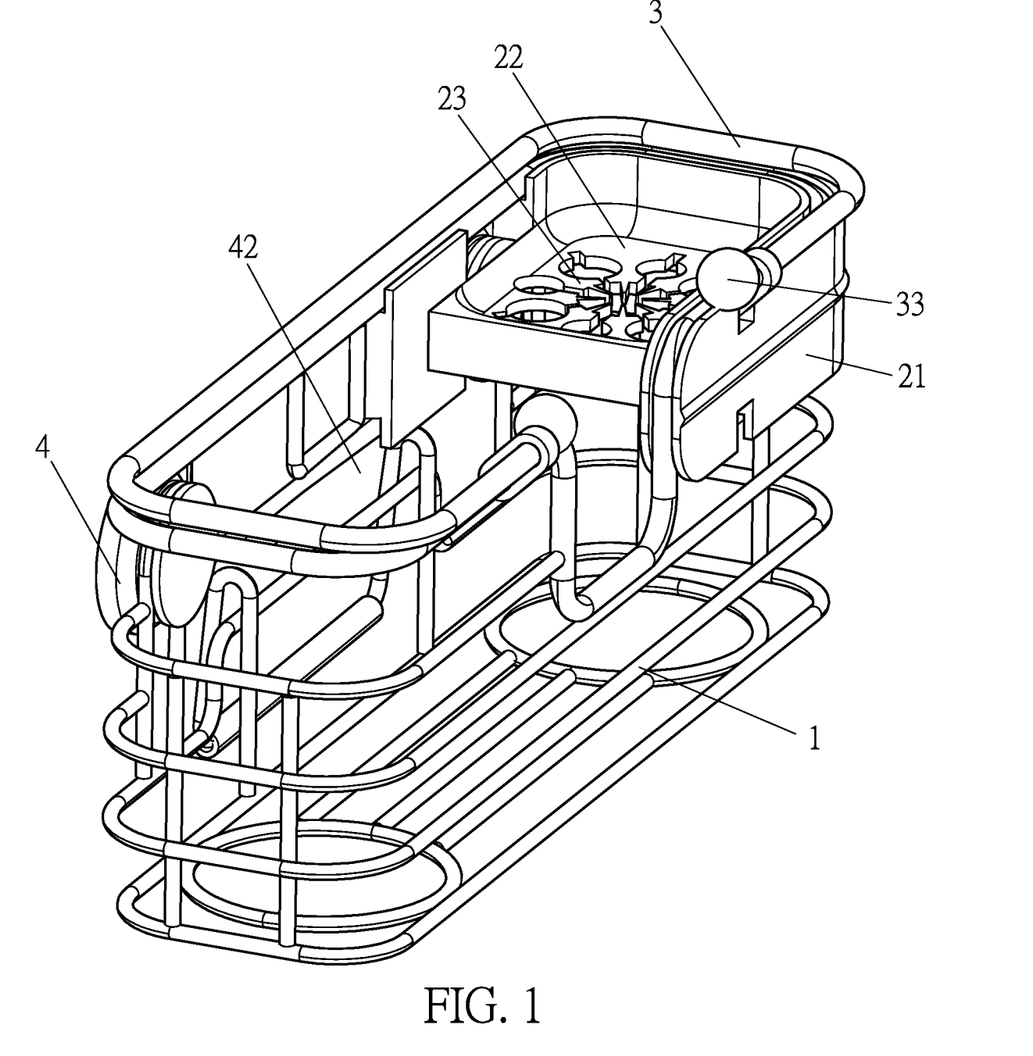
FIG. 1 is a schematic structural diagram of embodiment 1 of the present disclosure.
Figure 2:
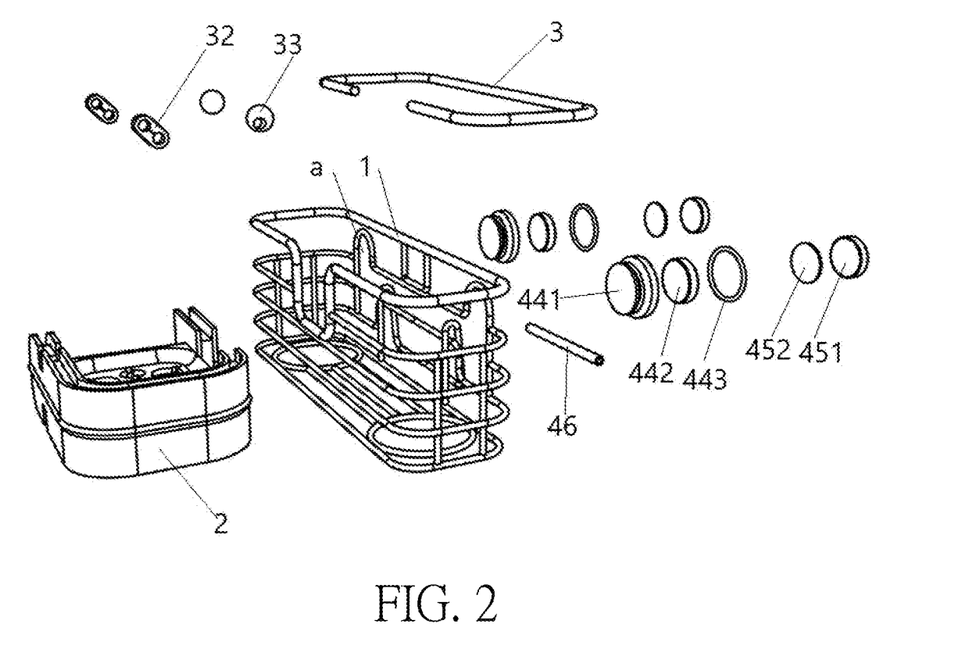
FIG. 2 is an exploded view of embodiment 1 of the present disclosure.
Figure 3:
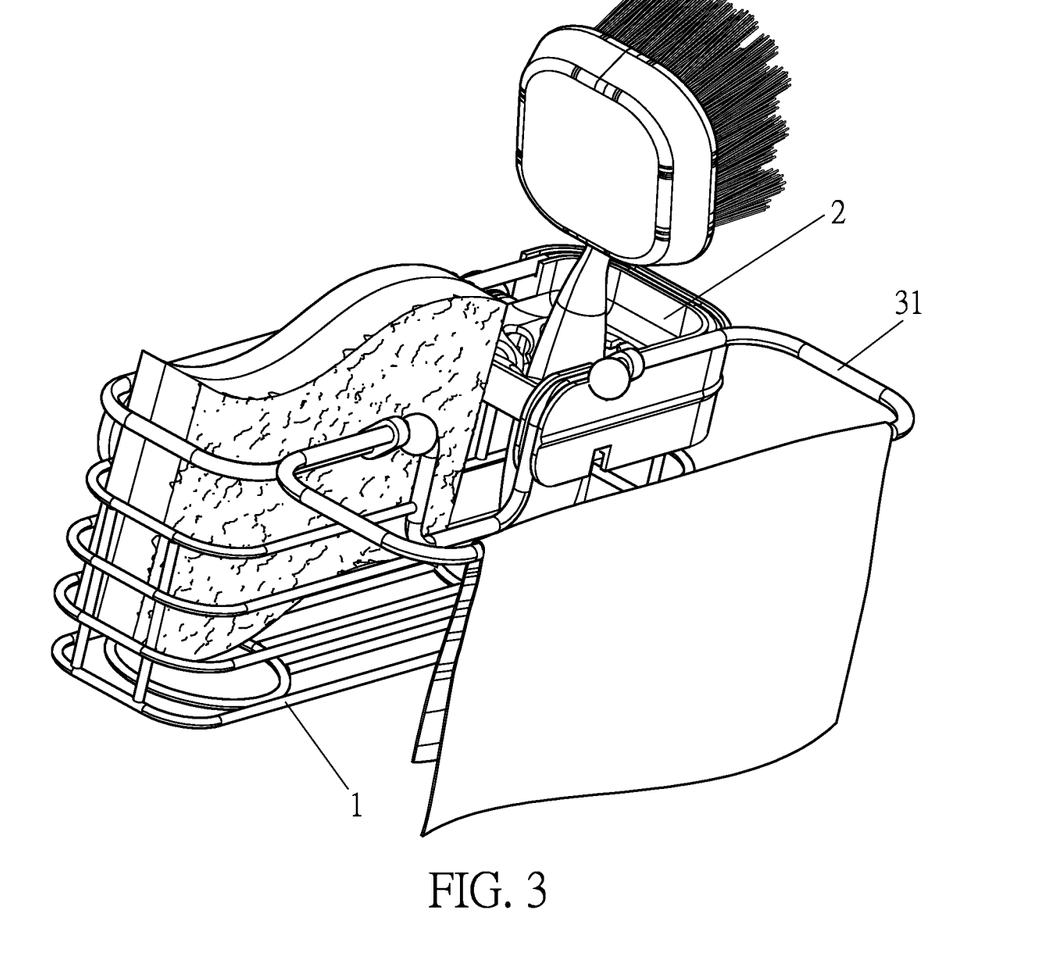
FIG. 3 is a use state diagram of embodiment 1 of the present disclosure.

This embodiment relates to a multifunctional draining rack. As shown in FIGS. 1 and 2, the multifunctional draining rack includes: a draining rack body 1, a cleaning brush rack 2, a towel hanger 3, and a fixing device 4.

The draining rack body 1 is a structure welded by steel bars and has a storage space. The cleaning brush holder 2 is detachably assembled on the draining holder body 1, and it is disassembled when not needed to increase the use space of the draining rack body 1 to achieve the effect of space adjustment. The towel hanger 3 is rotatably assembled on the side of the draining rack body 1, or the towel hanger 3 is in use for drying the towels. When the towel draining rack is not needed, the towel hanger 3 is rotated relative to the draining rack body 1 so as to be folded on the draining rack body 1 to avoid occupying the sink 5. In addition, the fixing device 4 is detachably assembled on the draining rack body 1 and used to fix the draining rack body 1 on the wall surface.

Figure 7:
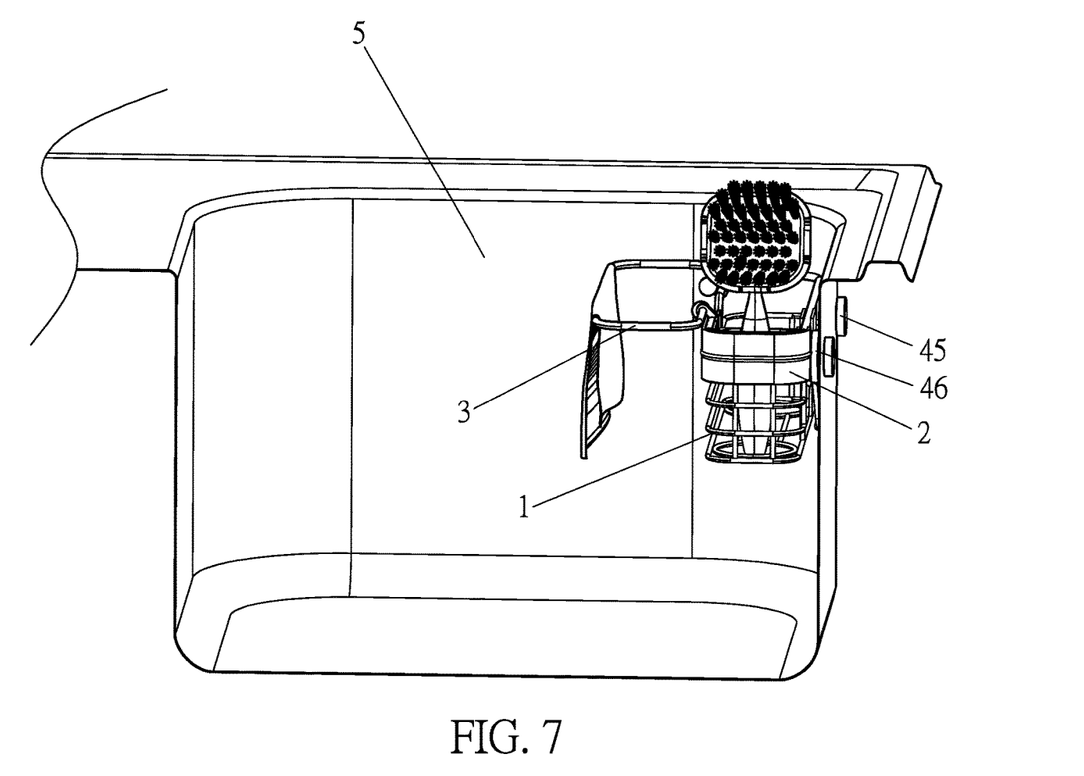
FIG. 7 is a schematic structural diagram of the installation state of embodiment 1 of the present disclosure.

As shown in FIGS. 2 and 7, in order to facilitate the installation of the draining rack body 1 and the sink, the fixing device 4 further includes a first magnetic attraction component 44 and a second magnetic attraction component 45. A limiting hole a is provided on the draining rack body 1, and the first magnetic attraction component 44 is inserted into the limiting hole a. The second magnetic attraction component 45 is arranged on the outer wall of the sink 5, and the second magnetic attraction component 45 is used in conjunction with the first magnetic attraction component 44 to fix the draining rack body 1. The draining rack body 1 is detachably connected to the sink 5 in a magnetic fixing manner, which is convenient for users to disassemble and assemble the draining rack body 1 according to requirements to adjust the use space of the sink 5.

Further, the first magnetic attraction component 44 includes: a fixing assembly 441, a first magnetic attraction part 442 and a flexible washer 443.

The fixing assembly 441 is inserted into the limiting hole a, the first magnetic attraction part 442 is adhered to the fixing assembly 441, and the flexible washer 443 is embedded between the first magnetic attraction part 442 and the fixing assembly 441 and partially protrudes from the fixing assembly 441 to avoid the first magnetic attraction part 442 scratching the sink 5 during use.

Further, the second magnetic attraction component 45 includes: a second magnetic attraction part 451 and an adhesive layer 452. One end of the adhesive layer 452 is adhered to the second magnetic attraction part 451, and the other end is adhered to the outer wall of the sink 5 corresponding to the second magnetic attraction part 451. Preferably, the adhesive layer 452 is a strong double-sided adhesive tape. The first magnetic attraction part 442 and the second magnetic attraction part 451 are both neodymium iron boron strong magnets.

Figure 4:
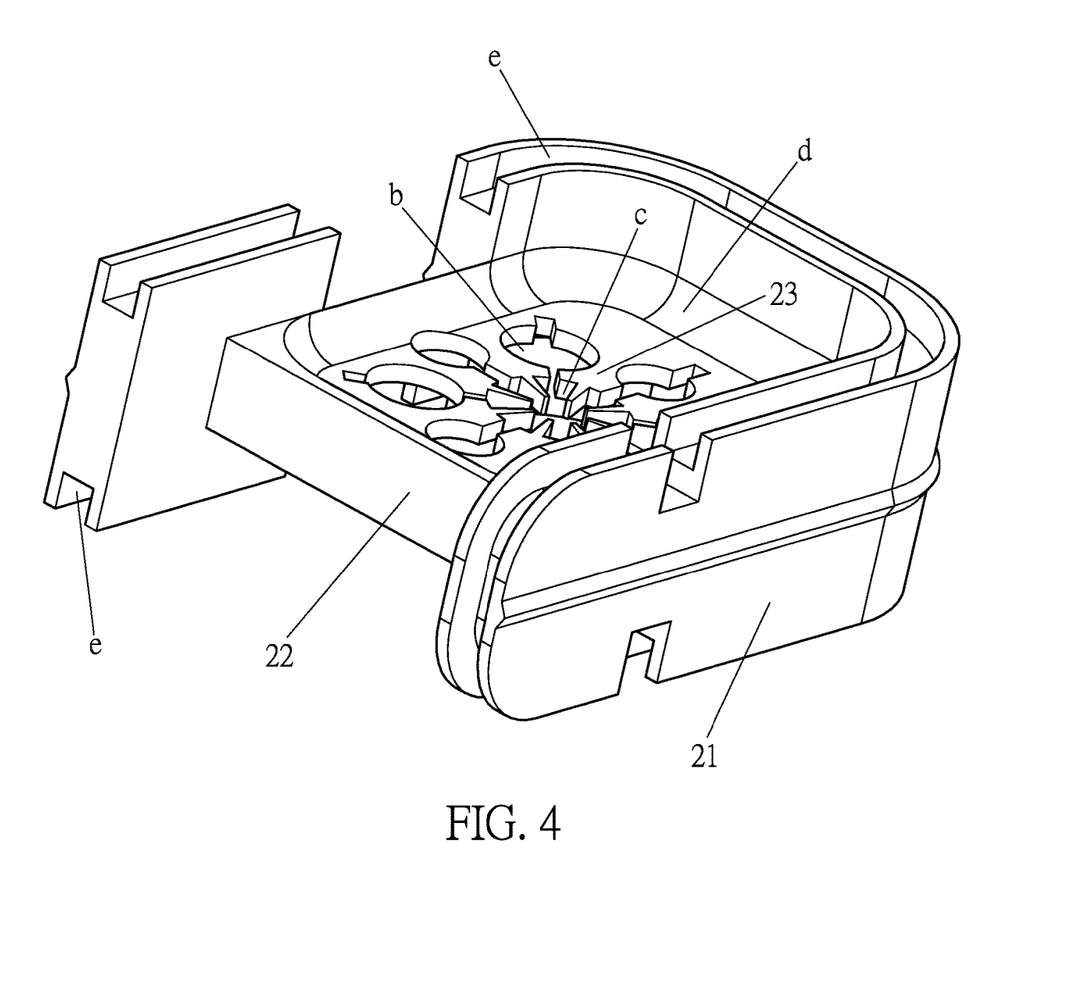
FIG. 4 is a schematic structural diagram of the cleaning brush holder of embodiment 1 of the present disclosure.

As shown in FIG. 4, the cleaning brush holder 2 includes a brush holder body 21 on which a disassembly structure is provided. The disassembly structure is used to embody the detachable assembly of the cleaning brush holder 2 and the draining rack body 1. Preferably, the brush holder body 21 is U-shaped, the shape of both ends of the draining rack body 1 is corresponding to the brush holder body 21, and the disassembly structure is symmetrically provided with the clamping slots e at both ends of the brush holder body 21, and the clamping slots e is set corresponding to the brush holder body 21 to be U-shaped. The brush holder body 21 can be assembled with both ends of the draining rack body 1 through the clamping slots e. In this way, it is convenient for users who use the left or right hand as the dominant hand.

Further, an inserting plate 22 is provided in the middle of the brush holder body 21, an insertion portion for inserting the cleaning brush is arranged on the inserting plate 22, and a plurality of elastic abutment blocks 23 are arranged on the edge portion of the insertion portion. The elastic abutment blocks 23 are compressed and deformed during the insertion and placement of the cleaning brush, and after the cleaning brush is inserted, the cleaning brush is pressed tightly to maintain in a fixed inserted state under the action of restoring force of the elastic abutment blocks. It should be noted that the insertion state is vertical to the placement surface. This structure can prevent the cleaning brush from colliding with the cleaning brush holder 2 when it is inserted to generate noise and the insertion portion is difficult to control, which affects the neatness of the placement and causes the inclined protrusion of the cleaning brush holder 2 to occupy the space of the sink 5.

Further, the plurality of elastic abutment blocks 23 are arranged equidistantly along a circumferential direction of the insertion portion, and an end of the elastic abutment block 23 away from the edge portion is oriented to the center of the insertion portion. Preferably, the elastic abutment block 23 is triangular, trapezoidal, elliptical, rhombic or rectangular. In this embodiment, the elastic abutment block 23 is triangular. A first draining sink b is symmetrically provided at one end of each elastic abutment block 23 near the edge portion, and a second draining sink c is symmetrically provided away from the edge portion. Preferably, the first draining sink b has a circular arc shape, and the second draining sink c has a triangular shape.

Further, a water collection tank d is provided on the inserting plate 22, and the insertion portion is set in the water collection tank d. The water collection tank d is used to collect the water on the cleaning brush and drain it down through the first draining sink b and the second draining sink c. The brush holder body 21 is made of silicone, rubber or plastic. In this embodiment, the brush holder body 21 is made of silica gel.

Figure 5:
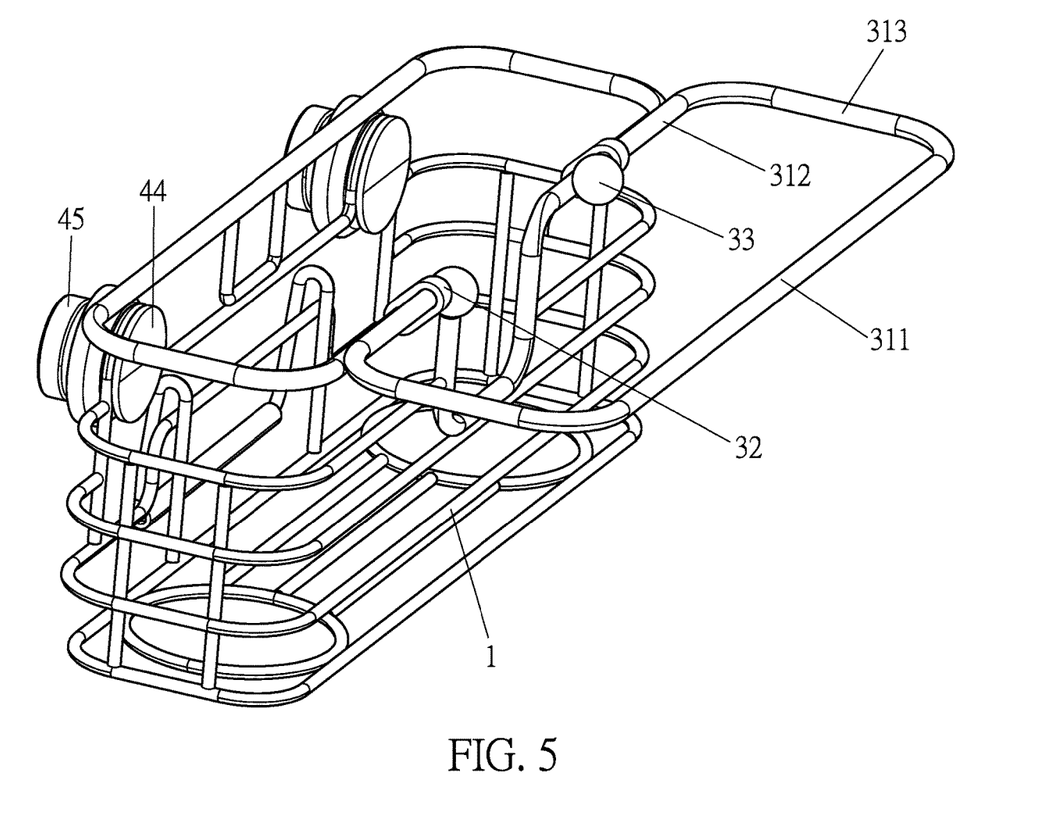
FIG. 5 is a schematic diagram of the draining rack body, fixing device and towel hanger of embodiment 1 of the present disclosure.
Figure 6:
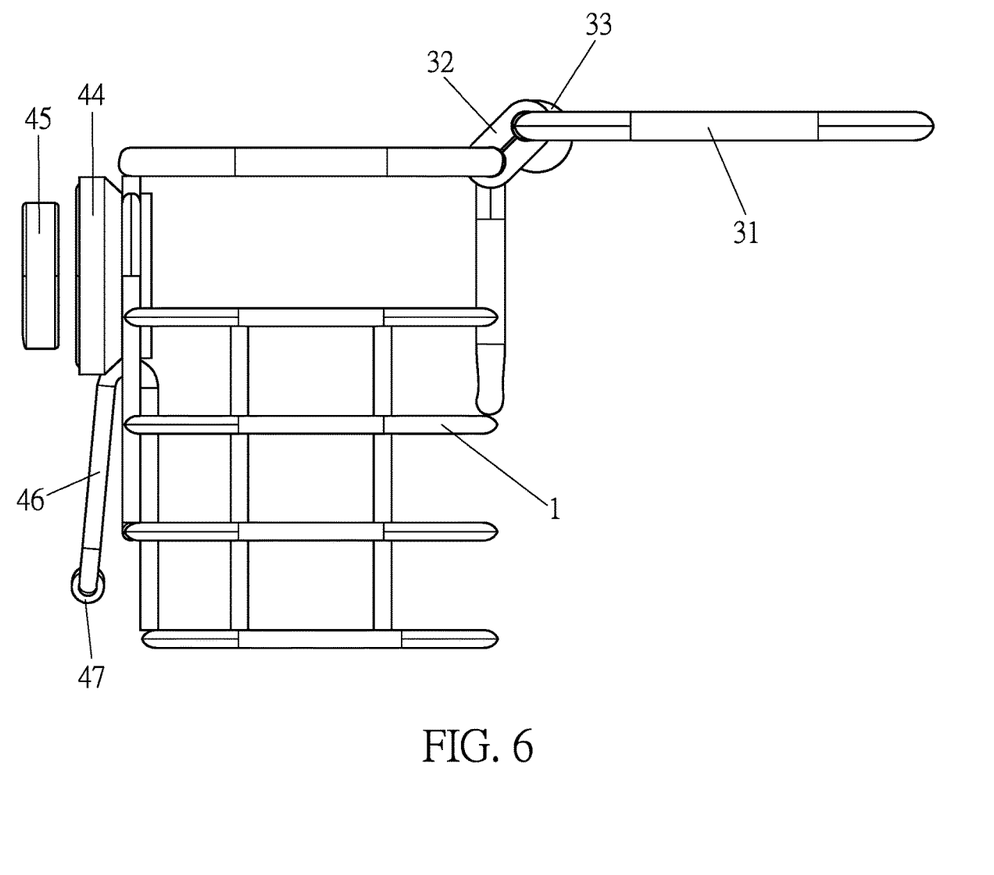
FIG. 6 is a left view corresponding to FIG. 5.

As shown in FIGS. 5 and 6, the towel hanger 3 includes a hanger body 31, a rotating member 32 and a stopper 33.

The towel hanger 3 includes a hanger body 31, a rotating member 32 and a stopper 33. The hanger body 31 is rotatably assembled on the draining rack body 1 and can rotate relative to the draining rack body 1 to be folded on the draining rack body 1 or in use. The rotating member 32 is assembled between the hanger body 31 and the draining rack body 1. The stopper 33 is assembled between the hanger body 31 and the draining rack body 1, and is used to limit the rotation angle of the draining body 31 to maintain the hanger body 31 in usage state.

Further, the stopper 33 includes an eccentric ball. The eccentric ball is assembled on the hanger body 31 and located on a side of the rotating member 32 and configured to rotate with the hanger body 31 to be abutted against the draining rack body 1 to limit the assembly of the hanger body 31. The hanger body 31 is offset from a center of the eccentric ball. In other embodiments, the stopper 33 is a bent portion formed by bending the end of the connecting rod 312 away from the supporting rod 313, and the angle between the bent portion and the connecting rod 312 is 90 degrees.

Further, the rotating member 32 includes a rotating block. The rotating block is provided with two mounting holes for the rack rod of the hanger body 31 and the rotating part of the draining rack body 1 at intervals. Preferably, the rotating block is oval.

The hanger body 31 includes: a hanging rod 311, a connecting rod 312 and a supporting rod 313. The connecting rod 312 is assembled to the open end of the draining rack body 1 through the rotating member 32. The supporting rod 313 connects the hanging rod 311 and the connecting rod 312. Preferably, the hanging rod 311 may be provided with one or more. In this embodiment, one hanging rod 311 may be provided. There are two supporting rods 313 and connecting rods 312. One end of the two supporting rods 313 is respectively assembled on the two ends of the hanging rod 311, and the other end is respectively assembled on one end of the two connecting rods 312. The eccentric ball and the other end of the connecting rod 312 have an interference fit. The rotating member 32 is assembled on the connecting rod 312 close to the end of the stopper 33.

As shown in FIG. 6, in order to avoid the problem of the draining rack body 1 causing damage to the inner wall of the sink during use, and the problem of the draining rack body 1 being close to the inner wall of the sink to result in dirt accumulating and difficulty in cleaning, a supporting frame 46 is provided on the draining rack body 1 on the side of the fixing device. The supporting frame 46 extends from the side of the draining rack body 1 to the side close to the sink, and forms an angle with the draining rack body 1. The distance between the supporting frame 46 and the draining rack body 1 is smaller than the thickness of the first magnetic attraction component 44 protruding from the draining rack body 1. A protective cover 47 is sheathed on the supporting frame 46 at one end away from the draining rack body 1. Preferably, the protective cover 47 is a sponge product.

The working principle of the present disclosure is roughly as follows. During use, according to the user's hand habits, the symmetrical clamping slots e on both ends of the brush holder body 21 are clamped with the rack bars of the draining rack body 1 to install the cleaning brush holder on the left or right side of the draining port of the draining rack body 1 to make it easier for users to access. When the brush holder does not need to be cleaned, it is disassembled to increase the use space of the draining rack body 1 to achieve the effect of flexible space adjustment.

In addition, the elastic abutment blocks 23 are arranged on the installation position 422, so that when the cleaning brush is inserted, the elastic abutment blocks 23 are compressed and deformed during the insertion and placement of the cleaning brush, and after the cleaning brush is inserted, the cleaning brush is pressed tightly to maintain in a perpendicular manner to the placement surface under the action of restoring force of the elastic abutment blocks 23, which improves the neatness of storage, and avoids the problem of oblique protrusions occupying the space of the sink when the cleaning brush is inserted obliquely, and the process of inserting and removing the cleaning brush is very quiet, docile and comfortable.

Finally, the towel hanger 3 is assembled on the draining rack body 1 through the rotating member 32, and when the towels do not need to be dried, the towel hanger 3 is rotated to fold on the draining rack body 1, thereby saving the space of the sink 5. Besides, the stopper 33 is an eccentric ball assembled on the towel hanger 3, and the eccentric ball can make the towel hanger 3 rotate relative to the draining rack body 1 and stop at a predetermined drying angle, thereby protecting the towel hanger 3 and the draining rack body 1 from being scratched.

Embodiment 2

Figure 8:
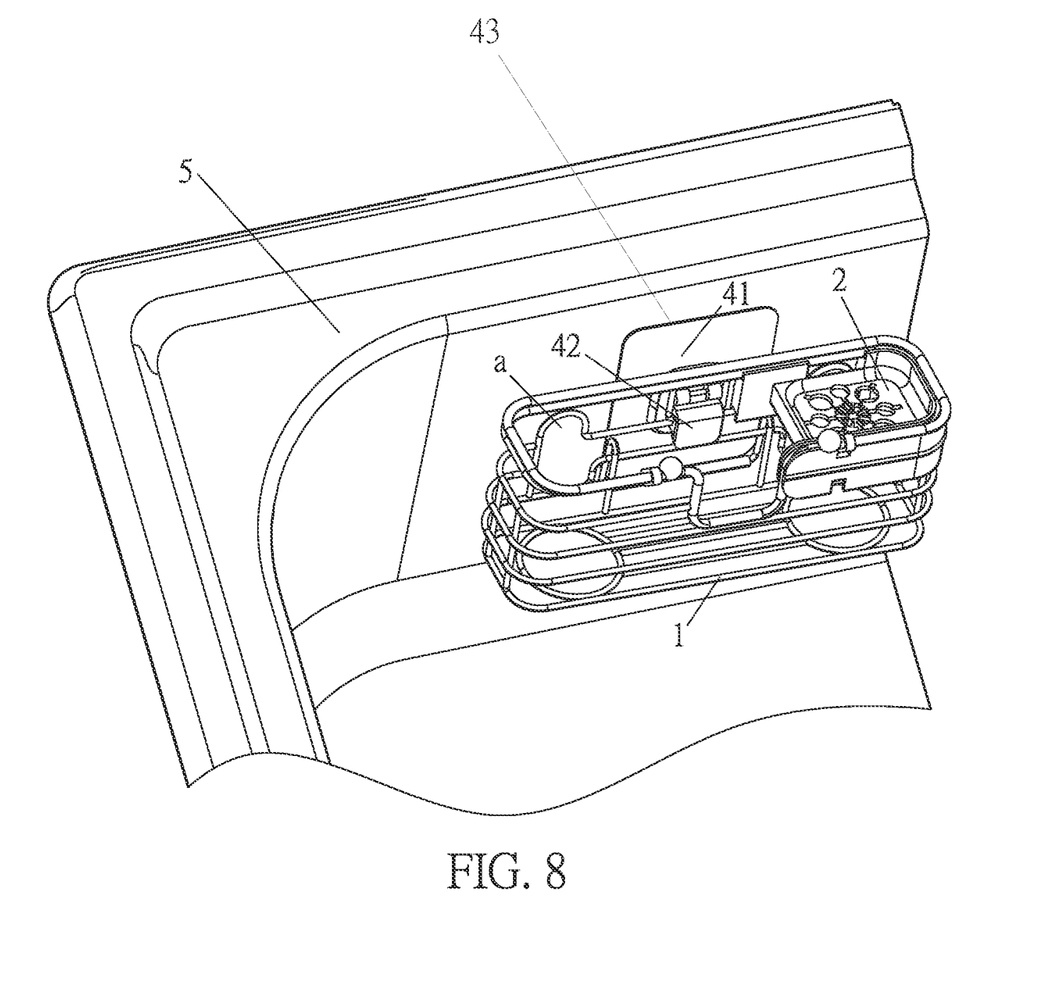
FIG. 8 is a schematic structural diagram of the installation state of embodiment 2 of the present disclosure.

The main difference between this embodiment and the first embodiment is that, as shown in FIGS. 7 and 8, the fixing device 4 includes: a fixing plate 41, a clamping assembly 42 and a connecting piece 43. The clamping assembly 42 is fixedly assembled on the fixing plate 41 and used to clamp the draining rack body 1. One end of the connecting piece 43 is fixedly assembled on the fixing plate 41, and the other end is fixedly connected to the wall surface. Preferably, the connecting piece 43 is a double-sided tape. When the draining rack body 1 is installed, it is suitable for both the sink 5 with a thinner wall or a bathroom with thicker wall, which reduces the environment conditions for the installation of the draining rack and increases its application place.

Figure 9:
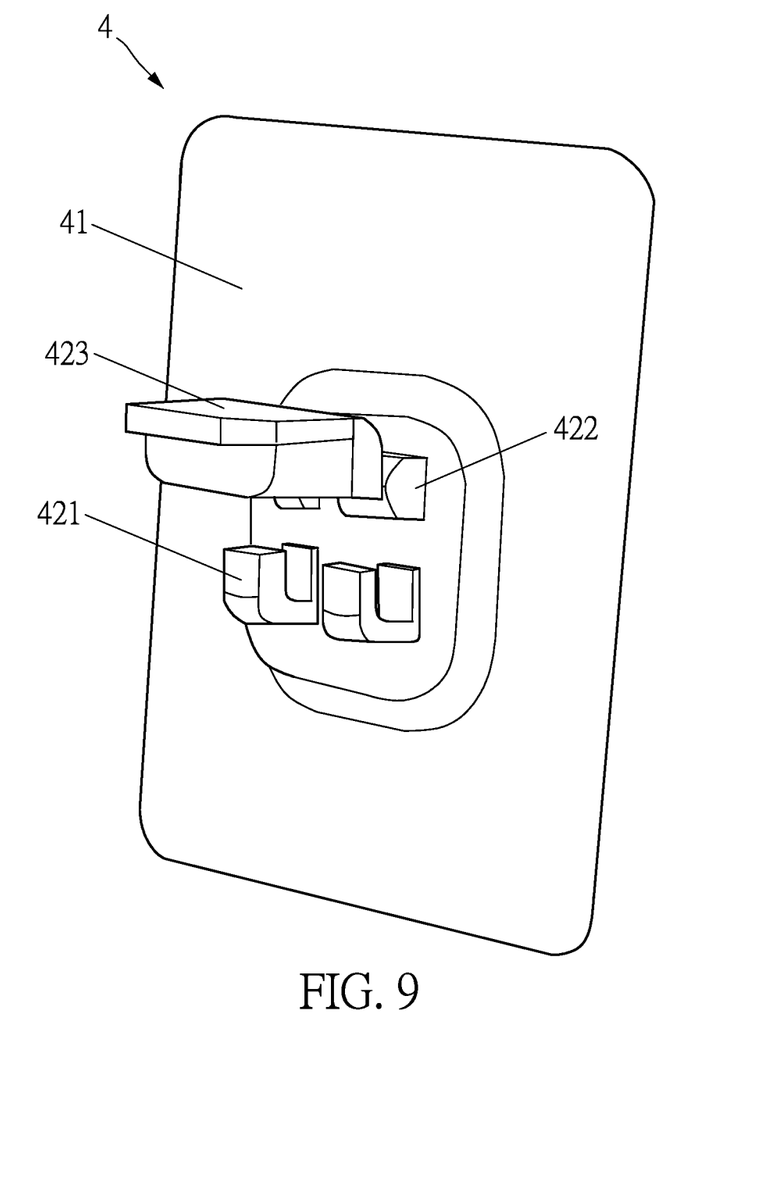
FIG. 9 is a schematic structural diagram of the fixing device according to embodiment 2 of the present disclosure.

Furthermore, the clamping assembly 42 includes a bracket block 421, a mounting position 422 and a buckle block 423.

The bracket block 421 is fixedly assembled on the fixing plate 41 and used to support the steel bar of the draining rack body 1 when in use. Preferably, the bracket block 42 is L-shaped, the vertical end of the bracket block 421 is parallel to the fixing plate 41, and the horizontal end of the bracket block 421 is fixedly connected to the fixing plate 41 on the side away from the vertical end. The fixing plate 41 is provided with a square boss, and the mounting position 422 is fixedly assembled on the boss. The installation includes two convex blocks arranged on the boss at intervals, and two opposite sides of the two convex blocks are provided with holes. The rotating shaft is inserted into the two holes. The buckle block 423 is hinged to the mounting position 422 via a rotating shaft. The buckle block 423 is used to rotate relative to the fixing plate 41 to buckle or unbuckle with the bracket block 421 to clamp or loosen the steel bar. Preferably, the buckle hole of the buckle block 423 is provided corresponding to the clamping block. When the buckle block 423 and the bracket block 421 are buckled together, the bracket block 421 is accommodated in the buckle hole and cooperates with the buckle block 423 to clamp the steel bar.

The above are only used to illustrate the technical solution of the present disclosure and not to limit it. Other modifications or equivalent substitutions made by those of ordinary skill in the art to the technical solution of the present disclosure shall be covered within the scope of the claims of the present invention as long as they do not depart from the spirit and scope of the technical solution of the present disclosure.

What is claimed is:

1. A multifunctional draining rack, comprising:
    a draining rack body (1) provided with a storage space;
    a cleaning brush holder (2) detachably assembled on the draining rack body (1); and
    a towel hanger (3) assembled on the draining rack body (1) and configured to rotate relative to the draining rack body (1) for folding or in use,
    wherein the towel hanger (3) comprises:
        a hanger body (31) rotatably assembled on the draining rack body (1) and configured to rotate relative to the draining rack body (1) to be folded on the draining rack body (1) or in use;
        a rotating member (32) assembled between the hanger body (31) and the draining rack body (1); and
        a stopper (33) assembled between the hanger body (31) and the draining rack body (1) for limiting a rotation angle of the hanger body (31) to maintain the hanger body (31) in usage state, and
    wherein the stopper (33) comprises: an eccentric ball assembled on the hanger body (31), located on a side of the rotating member (32) and configured to rotate with the hanger body (31) to be abutted against the draining rack body (1), and the hanger body (31) is offset from a center of the eccentric ball.

2. The multifunctional draining rack according to claim 1, wherein the cleaning brush holder (2) comprises: a brush holder body (21) on which an insertion portion for inserting a cleaning brush is provided; a plurality of elastic abutment blocks (23) are provided on an edge portion of the insertion portion, and the elastic abutment blocks (23) are compressed and deformed during the insertion and placement of the cleaning brush, and after the cleaning brush is inserted, the cleaning brush is pressed tightly to maintain in a fixed inserted state under the action of restoring force of the elastic abutment blocks (23), and
    wherein clamping slots (e) are symmetrically provided at both ends of the insertion portion on the brush holder body (21), and a rack bar of the draining rack body (1) is clamped in the clamping slots (e) to embody that the cleaning brush holder (2) and the draining rack body (1) are detachably assembled.

3. The multifunctional draining rack according to claim 2, wherein a plurality of the elastic abutment blocks (23) are arranged equidistantly along a circumferential direction of the insertion portion, and one end of the elastic abutment blocks (23) away from the edge portion is oriented to a center of the insertion portion.

4. The multifunctional draining rack according to claim 1, wherein the rotating member (32) comprises: a rotating block on which two mounting holes are assembled at intervals, and the mounting holes are respectively configured to assemble the hanger body (31) and the draining rack body (1).

5. The multifunctional draining rack according to claim 1, further comprising: a fixing device (4) detachably assembled on the draining rack body (1) and configured to fix and mount the draining rack body (1) on a wall surface.

6. The multifunctional draining rack according to claim 5, wherein the fixing device (4) comprises:
    a fixing plate (41);
    a clamping assembly (42) fixedly assembled on the fixing plate (41) for clamping the draining rack body (1); and
    a connecting piece (43) of which one end is fixedly assembled on the fixing plate (41), and the other end is fixedly connected to the wall surface.

7. The multifunctional draining rack according to claim 6, wherein the clamping assembly (42) comprises:
    a bracket block (421) fixedly assembled on the fixing plate (41) and configured to support a rack bar of the draining rack body (1);
    a mounting position (422) provided on the fixing plate (41); and
    a buckle block (423) hinged on the mounting position (422) by a rotating shaft and configured to rotate relative to the fixing plate (41) to buckle or unbuckle with the bracket block (421) to clamp or loosen the rack bar of the draining rack body (1).

8. The multifunctional draining rack according to claim 5, wherein a limiting hole (a) is provided on the draining rack body (1), and the fixing device (4) further comprises:
- a first magnetic attraction component (44) inserted into the limiting hole (a); and
- a second magnetic attraction component (45) arranged on the wall surface and configured in conjunction with the first magnetic attraction component (44) to fix the draining rack body (1) to a sink (5).

\* \* \* \* \*